Dec. 8, 1925.  1,564,376
R. SOHNER
CLAWED DRIVING WHEEL FOR MOTOR PLOWS, TRACTORS, AND THE LIKE
Filed March 3, 1925
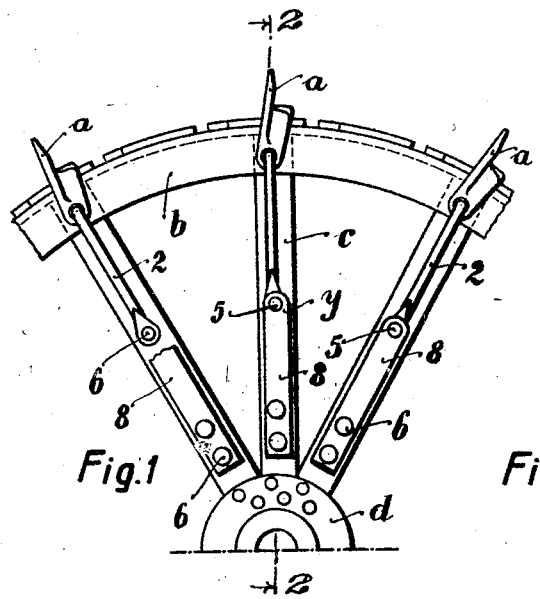
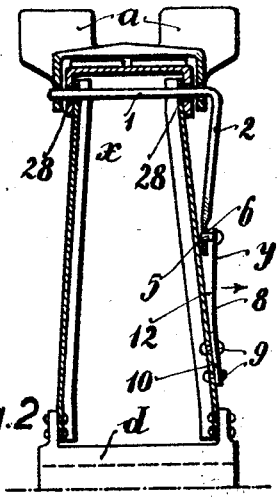
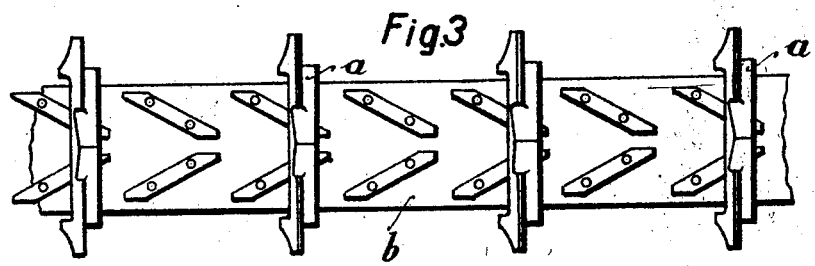
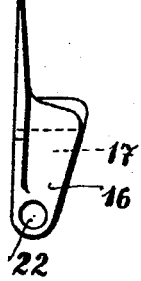
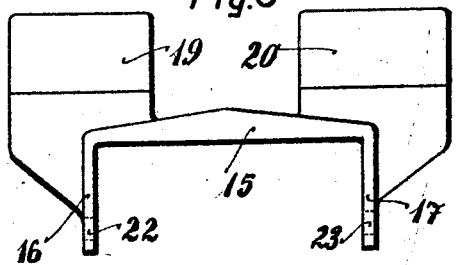
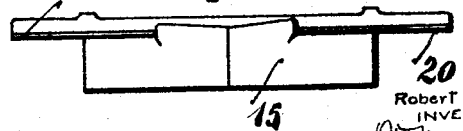
Robert Sohner
INVENTOR Patented Dec. 8, 1925.

1,564,376

UNITED STATES PATENT OFFICE.

ROBERT SOHNER, OF VIENNA, AUSTRIA.

CLAWED DRIVING WHEEL FOR MOTOR PLOWS, TRACTORS, AND THE LIKE.

Application filed March 2, 1925. Serial No. 12,913.

*To all whom it may concern:*

Be it known that I, ROBERT SOHNER, a citizen of the Republic of Austria, and residing at Vienna, Austria, Knollgasse 35, have invented certain new and useful Improvements in Clawed Driving Wheels for Motor Plows, Tractors, and the like, of which the following is a specification.

Clawed driving wheels for motor plows, motor tractors and the like, having claws arranged detachably upon the wheel felloe, are already known. The existing clawed driving wheels of this type suffer from the particular disadvantage that the arrangements for bolting the claws to the wheel felloe are situated in the immediate neighbourhood of the periphery of the driving wheel, so that if the driving wheel sinks, even slightly, into the ground, contact takes place between the bolting means and the earth and the locking means become completely soiled with the earth and are frequently also damaged. The attaching and detaching of the claws in known clawed driving wheels is troublesome and takes a considerable time.

The object of the present invention is to avoid the above-mentioned disadvantages of known forms of clawed driving wheels. This is achieved, according to the present invention, by arranging the parts of the coupling members which serve to attach the claws, and the corresponding locking devices, at a distance from the periphery of the driving wheel in order to prevent contact of the securing or locking parts with the ground.

One constructional example of the invention is illustrated in the accompanying drawings, in which—

Fig. 1 shows a part of a clawed driving wheel in front elevation.

Fig. 2 a section on the line II—II of Fig. 1.

Fig. 3 a plan view of the development of a portion of the wheel felloe.

Figs. 4, 5 and 6 show a claw in side elevation, front elevation and plan respectively.

*a* are the claws, *b* the wheel felloe, *c* the spokes and *d* the hub of the driving wheel. The felloe and the spokes of the driving wheel are made, in the present example, of U-shape cross-section. Each of the claws *a* is connected to the driving wheel by means of a coupling device *x*. A releasable locking device *y* co-operates with each coupling device and secures it and the claw firmly in position upon the body of the wheel. The coupling device *x* and the locking device *y* may be constructed and arranged in different ways. In the example illustrated, the coupling device consists of an angle piece, one arm 1 of which is formed as a securing bolt and is of circular cross-section. The second arm 2 is also of circular cross-section, and may be locked to parts of the driving wheel by means of the locking device *y*. The locking device *y* consists of a spring-loaded pin 5 which engages in a hole 6 (Fig. 1) in the end of the second arm 2. The pin 5 is at the end of a leaf spring 8, the other end of which is secured to the spokes *c* of the driving wheel by means of rivets 9. Between the leaf spring 8 and the spokes *c* is a distance piece 10. A swinging space 12 for the arm 2 of the bolting device is formed between the leaf spring 8 and the spokes *c*.

The claws consist, according to the example illustrated, of a single casting. Each claw has a base plate 15 of rectangular shape which rests upon the periphery of the wheel. Securing lugs 16 are provided upon the smaller sides of the base plate and projecting downwards from it. On one of the longer sides of the base plate are two spaced claw prongs 19, 20 extending upwards. These prongs consist of plates of the shape shown in Figs. 5 and 6. The cross-section of the base plate is made greater in the middle than at the edges for the purpose of preventing breakage of the base plate if incomplete contact takes place between it and the periphery of the wheel. Holes 22 and 23 are formed in the securing lugs 16, 17, through which holes the arm 1 of the angle member passes when the claws are attached to the wheel felloe. The claws 19, 20 are arranged somewhat inclined relative to the base plate 15 in known manner, and by this means a satisfactory grip with the ground is ensured. When the claws are placed and bolted upon the wheel felloe the various components of the clawed driving wheel assume the positions shown in Figs. 1 to 3. The arms 1 of the angle pieces pass through the holes 22, 23 in the securing lugs and through the holes 28 in the spokes, so that the bolting arms 2 are upon one side of the spokes and lie along a line running through the wheel axis. The bolting arms 2 are bolted to the spokes by means of the locking device *y*. When it is required to remove the claws from the wheel it is only necessary to release the locking devices y one after the other and to withdraw the angle pieces from the wheel body. The release of the locking device takes place by moving the leaf spring in a direction shown by the arrow in Fig. 2. By this means the pin 5 comes out of engagement with the hole 6. The arm 2 may now be turned sideways until it is out of the swinging space 12. When this has been done the angle piece 1, 2 is withdrawn from the holes 22, 23, 28 and the coupling between the claw *a* and the wheel felloe *b* is freed. The claw may now be removed from the wheel felloe. In fitting the claw to the driving wheel the cycle of operations is reversed but is equally simple.

The method of fixing the claws, together with the particular construction of the claw which has been described, produce a driving wheel which satisfies particularly well all working requirements. The claws may be fastened to smooth wheel treads or to treads armored with tread blocks, as shown in the drawings, with equally good results. In the latter case the claws may either rest between the tread blocks or upon the tread blocks. An important advantage of the present driving wheel is that the attaching and detaching of the claws takes place from one side only so that a single person may in a very short time prepare the vehicle for use either upon streets or upon soft ground.

The design and arrangement of the various parts of the driving wheel may be altered without departing from the scope of the present invention.

I claim:

1. A wheel for motor plows and the like comprising a hub, a felloe, means connecting the felloe to the hub and apertured between the hub and the felloe, a detachable claw member projecting from the felloe, securing means adapted to pass through said apertures to hold the claw member in operative position on the felloe, and spring locking means carried by said connecting means for locking said securing means in operative position.

2. A wheel for motor plows and the like comprising a wheel body apertured between the circumference and the hub of the wheel, a detachable claw member adapted to project from the circumference of the wheel and having lugs adapted to lie substantially radially of the wheel, securing means adapted to pass through said lugs and said apertures to hold said claw member in operative position on the wheel, and spring locking means secured to said wheel body for locking said securing means in operative position.

3. A wheel for motor plows and the like comprising a felloe, apertured spokes, a claw member detachably carried by said felloe and having lugs adapted to lie substantially radially of the wheel, securing means adapted to pass through said lugs and said apertures to hold said claw member in operative position on the felloe, and spring locking means secured to said spokes for locking said securing means in operative position.

4. A wheel for motor plows and the like, as claimed in claim 3, said securing means comprising a member having an arm adapted to pass through said lugs and said apertures and another arm adapted to lie substantially radially of the wheel.

5. A wheel for motor plows and the like, as claimed in claim 3, said securing means comprising a member having an arm adapted to pass through said lugs and said apertures along a line substantially parallel to the axis of the wheel and another arm having apertures adapted to be engaged by said locking means.

6. A wheel for motor plows and the like, as claimed in claim 3, said spring locking means comprising a leaf spring secured to a spoke and provided with a pin at one end adapted to engage with said securing means.

7. A wheel for motor plows and the like, as claimed in claim 3, said securing means comprising a piece of round iron bent substantially to a right angle.

8. A wheel for motor plows and the like comprising a felloe, claw members adapted to be mounted on said felloe, and having lugs adapted to extend radially of the wheel and directed towards the center, apertured spokes, securing means comprising members having a portion adapted to pass through said lugs and apertured spokes and another portion adapted to extend substantially radially of the wheel and directed towards the wheel centre, and locking means comprising spring plates secured to said spokes and provided with pins at their free ends adapted to engage and hold the radially extending portions of said securing members.

9. A wheel for motor plows and the like, as claimed in claim 8, said free ends of the spring plates being spaced from the spokes, to receive the radially lying arms of the securing members therebetween.

10. A wheel for motor plows and the like, as claimed in claim 8, said claw members comprising each a base portion adapted to rest on the felloe of the wheel, and spaced outwardly extending claw portions carried by said base portion.

In testimony whereof I affix my signature.

ROBERT SOHNER.